(12) United States Patent
Sasaoka et al.

(10) Patent No.: US 7,382,956 B2
(45) Date of Patent: Jun. 3, 2008

(54) OPTICAL FIBERS

(75) Inventors: Eisuke Sasaoka, Yokohama (JP); Yoshinori Yamamoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/519,381

(22) PCT Filed: Aug. 4, 2004

(86) PCT No.: PCT/JP2004/011166

§ 371 (c)(1), (2), (4) Date: Sep. 20, 2005

(87) PCT Pub. No.: WO2005/012967

PCT Pub. Date: Feb. 10, 2005

(65) Prior Publication Data

US 2006/0093293 A1 May 4, 2006

(30) Foreign Application Priority Data

Aug. 4, 2003 (JP) ............................. 2003-286118
Dec. 24, 2003 (JP) ............................. 2003-427765

(51) Int. Cl.
G02B 6/02 (2006.01)
G02B 6/16 (2006.01)
G02B 6/00 (2006.01)

(52) U.S. Cl. ...................... 385/123; 385/124; 385/141; 385/144

(58) Field of Classification Search ................. 385/123
See application file for complete search history.

(56) References Cited

U.S. PATENT DOCUMENTS 4,089,586 A 5/1978 French et al.

(Continued)

FOREIGN PATENT DOCUMENTS

CN 1343893 4/2002

(Continued)

OTHER PUBLICATIONS

Characteristics of a single-mode optical fiber and cable G.652, Mar. 2003, ITU-T, Table 3/G.652.C.*

(Continued)

*Primary Examiner*—Frank G Font
*Assistant Examiner*—Ryan Lepisto
(74) *Attorney, Agent, or Firm*—McDermott Will & Emery LLP

(57) ABSTRACT

The present invention provides an optical fiber enabling signal transmission in a wider band, which is applicable to optical transmission not only in the 1.3 μm wavelength band but also in the 1.55 μm wavelength band, as a transmission medium of a WDM optical communication system capable of transmitting signal light of multiple channels. The optical fiber is comprised of silica glass and has a core region along a predetermined axis and a cladding region provided on the outer periphery of the core region. The optical fiber comprising such a structure has, as the following typical optical characteristics, a cable cutoff wavelength of 1260 nm or less, a transmission loss of 0.32 dB/km or less at the wavelength of 1310 nm, and an OH-related loss increase of 0.3 dB/km or less at the wavelength of 1380 nm.

10 Claims, 10 Drawing Sheets

U.S. PATENT DOCUMENTS

| | | | |
|---|---|---|---|
| 4,525,027 | A | 6/1985 | Okamoto et al. |
| 6,205,268 | B1 | 3/2001 | Chraplyvy et al. |
| 6,266,467 | B1* | 7/2001 | Kato et al. ............ 385/123 |
| 6,301,426 | B1 | 10/2001 | Jameson et al. |
| 6,345,140 | B1* | 2/2002 | Sasaoka et al. ............ 385/123 |
| 6,449,415 | B1 | 9/2002 | Sasaoka |
| 2002/0044753 | A1 | 4/2002 | Nagayama et al. |
| 2003/0147610 | A1* | 8/2003 | Tsukitani et al. ........... 385/127 |
| 2003/0174988 | A1* | 9/2003 | Bickham et al. ............ 385/127 |
| 2004/0033039 | A1* | 2/2004 | Oliveti et al. .............. 385/123 |
| 2004/0136668 | A1* | 7/2004 | Takahashi et al. .......... 385/123 |

FOREIGN PATENT DOCUMENTS

| | | |
|---|---|---|
| EP | 0 862 069 | 9/1998 |
| EP | 1 329 750 A2 | 7/2003 |
| JP | 62-176941 | 8/1987 |
| JP | JP 01-224706 | 9/1989 |
| JP | 02-217329 | 8/1990 |
| JP | 11-326670 | 11/1999 |
| JP | 2002-303741 A | 10/2002 |
| JP | 2003-084163 | 3/2003 |
| JP | 2003-084163 A | 3/2003 |
| JP | 2003-511736 A | 3/2003 |
| JP | 2003-255169 | 9/2003 |
| WO | WO 00/31573 | 6/2000 |
| WO | WO 01/27667 A2 | 4/2001 |

OTHER PUBLICATIONS

Nagayama et al.; "Ultra Low Loss (0.151 dB/km) Pure Silica Core fiber and Extension of Transmission Distance"; *Technical Report of IEICE*; c. 2002; pp. 1-6; vol. 102, No. 135; OCS2002-31; Japan.

Nagayama et al.; Ultra-Low-Loss (0.1484 dB/km) Pure Silica Core Fibre and Extension of Transmission Distance; *Electronic Letters*; c. 2002; pp. 1168-1169; vol. 38, No. 20; Japan.

Specification for Low Water Peak Single-Mode Optical Fiber (G.652D); 6HF2-S-03216; c. 2003; pp. 1-3.

"Corning® SMF-28e™ Optical Fiber—Evolving Networks Now"; PI1344; c. 2003; pp. 1-4.

"Official Filing Receipt Enhances Performance of the First and Only Zero Water Peak Fiber"; *OFS News Press Release*; c. 2003.

"Enhanced Single Mode Fiber"; Alcatel 6901; c. 2002.

Yokota et al.; "Loss Characteristics of Ultralow-Loss Pure Silica Core Single-Mode Fiber"; *The Institute of Electronics and Communication Engineers of Japan*; c. 1986; pp. 4-262.

Nagayama et al.; "Ultra Low Loss (0.151 dB/km) Fiber and Its Impact on Submarine Transmission Systems"; *Optical Fiber Communication Conference*; c. 2002; pp. FA10-1-FA10-3.

Office Action issued in related U.S. Appl. No. 10/532,708, dated Aug. 14, 2006.

"Mixing TrueWave® RS Fiber with Other Single-Mode Fiber Designs Within a Network." OFS White Paper 1002-0702, pp. 1-7.

"Corning® SMF-28e™ Optical Fiber Product Information." Issued Mar. 2003, pp. 1-4, Previously submitted Sep. 20, 2005.

"AllWave® Fiber: The New Standard for Single-Mode Fiberl" OFS Leading Optical Innovation, pp. 1-6.

"Alcatel 6901 Enhanced Singlemode Fiber." Rev 0, Jan. 2002, pp. 1-2, Previously submitted Sep. 20, 2005.

Nakahira, Mizuho., et al. "Measurement of Optical Fiber Loss and Splice Loss by Backscatter Method." The Transactions of the IECE of Japan, Oct. 1980, vol. E63, No. 10, pp. 762-767.

Nakahira, Mizuho., et al. "Measurement of Optical Fiber Loss by Backscatter Method." Technical Journal 1980, vol. 29, No. 11, pp. 1-9 (English Translation).

Lee, B.C., et al. "The Study on the Splice Loss Measurement by Uni-Directional OTDR and its Error Factors." Communication Cables and Related technologies, 1998, pp. 291-296.

M. Nakahira et al. "Measurement of Optical Fiber Loss by Backscatter Method". Report on research and practical use, 1980, 1851-1860, vol. 29, No. 11.

International Search Report issued in corresponding Japanese Patent Application No. JP 2004/011164, dated Nov. 22, 2004.

Supplementary European Search Report issued in corresponding European Patent Application No. 04771203.9-2216, dated on Apr. 11, 2007.

Voges, Petermann: "optische kommunikationstechnik", 2002, XP002416368, pp. 56-131, Springer, Berlin, Germany.

Chinese Office Action, with English Translation, issued in Chinese Office Action Patent Application No. 200480021839.8, dated on Jul. 6, 2007.

Search Report dated Apr. 11, 2007.

Chinese Office Action, with English Translation, issued in Chinese Patent Application No. 200480021447.1, dated Dec. 14, 2007.

Nagayama et al. "Ulta-low-loss (0.1484 dB/km) pure silica core fibre and extension of transmission distance", Electronics Letters, vol. 38 No. 20, Sep. 26, 2002, pp. 1168-1169.

* cited by examiner

Fig.5

| | | SAMPLE A | COMPARATIVE EXAMPLE A |
|---|---|---|---|
| TRANSMISSION LOSS $\alpha_{1310}$ | (dB/km) | 0.29 | 0.33 |
| TRANSMISSION LOSS $\alpha_{1380}$ | (dB/km) | 0.27 | 0.62 |
| TRANSMISSION LOSS $\alpha_{1550}$ | (dB/km) | 0.17 | 0.19 |
| LOSS DIFFERENCE $\Delta\alpha$ ($\alpha_{1550} - \alpha_{1310}$) | (dB/km) | 0.12 | 0.14 |
| OH-RELATED LOSS INCREASE $\Delta\alpha_{1310}$ | (dB/km) | 0.03 | 0.31 |
| CABLE CUTOFF WAVELENGTH | (nm) | 1220 | |
| ZERO DISPERSION WAVELENGTH | (nm) | 1310 | |
| MODE FIELD DIAMETER (AT WAVELENGTH OF 1550 nm) | ($\mu$m) | 9.7 | |
| BENDING LOSS (AT WAVELENGTH OF 1550 nm AND IN BENDING OF 20nm) | (dB/m) | 2 | |

Fig.8

| | Δn (%) | 2a (μm) | CABLE CUTOFF WAVELENGTH (nm) | MFD AT 1310nm (μm) | ZERO DISPERSION WAVELENGTH (nm) | CHROMATIC DISPERSION AT 1550 nm (ps/nm/km) | DISPERSION SLOPE AT 1550 nm (ps/nm²/km) | ZERO DISPERSION SLOPE (ps/nm²/km) | TRANSMISSION LOSS AT 1310 nm (dB/km) | TRANSMISSION LOSS AT 1380 nm (dB/km) | OH-RELATED LOSS INCREASE AT WAVELENGTH OF 1380nm (dB/km) | TRANSMISSION LOSS AT WAVELENGTH OF 1550nm (dB/km) | FIBER STRUCTURE (CORE MATERIAL/CLADDING MATERIAL) |
|---|---|---|---|---|---|---|---|---|---|---|---|---|---|
| SAMPLE B | 0.38 | 7.80 | 1166 | 8.53 | 1318 | 14.97 | 0.0540 | 0.0793 | ≦0.32 | ≦0.31 | ≦0.10 | ≦0.176 | PURE SILICA GLASS/ F-DOPED GLASS |
| SAMPLE C | 0.395 | 8.16 | 1230 | 8.60 | 1313 | 15.46 | 0.0544 | 0.0806 | | | | | |
| SAMPLE D | 0.39 | 8.02 | 1200 | 8.57 | 1313 | 15.39 | 0.0537 | 0.0801 | | | | | |
| SAMPLE E | 0.395 | 7.56 | 1135 | 8.37 | 1318 | 14.86 | 0.0531 | 0.0789 | | | | | |
| SAMPLE F | 0.42 | 7.60 | 1260 | 8.33 | 1307 | 15.75 | 0.0536 | 0.0816 | | | | | |
| SAMPLE G | 0.385 | 8.14 | 1184 | 8.72 | 1312 | 15.90 | 0.0547 | 0.0800 | | | | | |
| SAMPLE H | 0.38 | 8.52 | 1226 | 8.92 | 1304 | 16.66 | 0.0548 | 0.0819 | | | | | |
| SAMPLE I | 0.36 | 8.10 | 1133 | 8.92 | 1317 | 15.39 | 0.0544 | 0.0790 | | | | | |
| COMPARATIVE EXAMPLE | - | - | 1158 | 9.13 | 1316 | 16.50 | 0.0584 | 0.0850 | 0.33 | 0.62 | 0.31 | 0.19 | Ge-DOPED GLASS /PURE SILICA-GLASS |

US 7,382,956 B2

OPTICAL FIBERS

TECHNICAL FIELD

The present invention relates to optical fibers which can be applied to optical transmission paths in optical communication systems and others.

BACKGROUND ART

Optical communication systems are configured to transmit signal light through optical fiber as a transmission medium, thereby enabling fast transmission/reception of large volume of information. Wavelength Division Multiplexing (WDM) optical communication systems are configured to transmit signal light in which multiple channels of different wavelengths are multiplexed (multiplexed signal light), thereby enabling transmission/reception of larger volume of information. In recent years, there are demands for further increase of volume in the WDM optical communication systems and under such circumstances there are ideas to narrow the signal channel spacing in WDM optical transmission and to expand the wavelength band used in WDM optical transmission.

In order to expand the signal wavelength band, studies have been conducted to utilize the initial C-band (1530 nm-1565 nm) and also to use the L-band (1565 nm-1625 nm) and the U-band (1625 nm-1675 nm) on the longer wavelength side than the C-band. In addition, there are also studies to utilize the O-band (1260 nm-1360 nm), the E-band (1360 nm-1460 nm), and the S-band (1460 nm-1530 nm) on the shorter wavelength side than the C-band.

The optical fibers to transmit signal light in such a broad band are demanded to satisfy conditions such as a small transmission loss in the signal wavelength band. The optical fibers applied to the optical communication systems are generally transmission media consisting primarily of silica glass, which have a minimum transmission loss near the wavelength of 1550 nm in the C-band and an increase of loss due to OH-radical at the wavelength of 1380 nm.

Characteristics of standard single-mode optical fiber are defined by International Standard (ITU-T G.652). According to this Standard, a standard single-mode optical fiber has the zero dispersion wavelength of 1300 nm-1324 nm, the mode field diameter whose center value at the wavelength of 1310 nm is 8.6 µm-9.5 µm and whose tolerances of deviation are ±0.7 µm, and the cable cutoff wavelength of 1260 nm or less. Single-mode optical fibers compliant with this Standard are manufactured and sold by many optical fiber makers, for example, as described in Non-patent Documents 1 to 4.

On the other hand, as an optical fiber for the 1.55 µm wavelength band, for example, Non-patent Document 5 discloses an optical fiber having the transmission loss of 0.154 dB/km at the wavelength of 1550 nm, the transmission loss of 0.291 dB/km at the wavelength of 1300 nm, and the OH-related loss increase of 0.75 dB/km at the wavelength of 1380 nm. Additionally, Patent Document 1 discloses an optical fiber having the transmission loss of 0.170-0.173 dB/km at the wavelength of 1550 nm and the OH-related loss increase of 0.3 dB/km at the wavelength of 1380 nm.

Patent Document 1: U.S. Pat. No. 6,449,415

Non-patent Document 1: Catalog of Sumitomo Electric Industries, Ltd., "Specification for Low Water Peak Single-Mode Optical Fiber (G.652D) <PureBand™>," Aug. 25, 2003

Non-patent Document 2: Catalog of Corning Inc., "Corning R SMF-28e™ Optical Fiber Product Information," March 2003

Non-patent Document 3: Catalog of OFS, "AllWave R Fiber The New Standard for Single-Mode Fiber," 2003

Non-patent Document 4: Catalog of Alcatel, "Alcatel 6901 Enhanced Singlemode Fiber," January 2002

Non-patent Document 5: Hiroshi Yokota et al., "Loss characteristics of ultralow-loss pure silica core single-mode fiber," THE INSTITUTE OF ELECTRONICS AND COMMUNICATION ENGINEERS, 1986 General Conference, 1091

DISCLOSURE OF THE INVENTION

Problems to be Solved by the Invention

Inventors investigated the conventional optical fibers and found the following problems. Specifically, the aforementioned standard single-mode optical fiber compliant with International Standard (ITU-T G.652) is originally designed toward an optical transmission path to transmit the signal light of the 1.3 µm wavelength band, and thus has a problem in terms of transmission quality if it is applied to an optical transmission path to transmit the signal light of the 1.55 µm wavelength band. In particular, where the standard single-mode optical fiber was applied as an optical transmission path of a WDM optical communication system to transmit the multiplexed signal light of the 1.55 µm wavelength band, there was the problem that the waveform was likely to degrade in each signal channel.

On the other hand, the optical fiber described in the aforementioned Non-patent Document 5 is acceptable in view of the small transmission loss at the wavelength of 1300 nm, but has the large loss increase due to OH-radical at the wavelength of 1380 nm. In other words, the optical fiber described in above Non-patent Document 5 has the extremely large transmission loss in the wavelength band at and around the wavelength of 1380 nm as compared with those in the other wavelength bands, and is thus unsuitable for signal transmission in the wavelength band including the wavelength of 1380 nm.

The optical fiber described in the aforementioned Patent Document 1 is acceptable in view of the small loss increase due to OH-radical at the wavelength of 1380 nm, but has the cutoff wavelength of 1310 nm or more, or has the zero dispersion wavelength of 1350 nm. For this reason, the optical fiber described in above Patent Document 1 is unsuitable for signal transmission in the wavelength band near the wavelength of 1310 nm.

The present invention has been accomplished in order to solve the problems as described above, and an object of the present invention is to provide an optical fiber excellent in compatibility with the standard single-mode optical fiber defined by International Standard (ITU-T G.652) (capable of high-quality multiplexing transmission in the 1.3 µm wavelength band), capable of high-quality multiplexing transmission in the 1.55 µm wavelength band as well, and suitable for signal transmission in a wider band.

Means for Solving the Problems

An optical fiber according to the present invention is an optical transmission medium which comprises a core region extending along a predetermined axis, and a cladding region provided on an outer periphery of the core region, and which is mainly comprised of silica glass. Particularly, an optical fiber according to a first embodiment has a cable cutoff wavelength of 1260 nm or less, a transmission loss of 0.32 dB/km or less at the wavelength of 1310 nm, and an OH-related loss increase of 0.3 dB/km or less at the wavelength of 1380 nm.

Since the optical fiber with the characteristics as described above is the transmission medium mainly comprised of silica glass, the transmission loss is minimum near the wavelength of 1550 nm. The optical fiber has the small transmission loss at the wavelength of 1310 nm and also has the small loss increase due to OH-radical at the wavelength of 1380 nm. Furthermore, since the cable cutoff wavelength is 1260 nm or less, the foregoing optical fiber is able to secure low-loss and single-mode transmission of signal light in a wide signal wavelength band ranging from the O-band to the L-band.

In the optical fiber according to the first embodiment, the transmission loss at the wavelength of 1310 nm is more preferably 0.30 dB/km or less. In this case, the optical fiber is able to transmit the signal light near the wavelength of 1310 nm with lower loss over a long haul.

In the optical fiber according to the first embodiment, a transmission loss at the wavelength of 1380 nm is preferably smaller than the transmission loss at the wavelength of 1310 nm. This is advantageous in low-loss and long-haul transmission of signal light near the wavelength of 1380 nm.

In the optical fiber according to the first embodiment, a difference between the transmission loss at the wavelength of 1310 nm and the transmission loss at the wavelength of 1550 nm is preferably 0.13 dB/km or less. In this case, the difference is small between the transmission losses at the two wavelengths of 1310 nm and 1550 nm, and it is thus feasible to implement transmission of signal light with homogeneous quality in a wide signal wavelength band.

In the optical fiber according to the first embodiment, a zero dispersion wavelength thereof is preferably 1300 nm or more but 1324 nm or less. In this case, the zero dispersion wavelength of the optical fiber is nearly equal to the zero dispersion wavelength of the standard single-mode optical fiber, and thus the optical fiber is excellent in compatibility with the standard single-mode optical fiber and advantageous in view of dispersion compensation.

In the optical fiber according to the first embodiment, a polarization mode dispersion thereof is preferably 0.5 $ps/km^{1/2}$ or less at the wavelength of 1550 nm. In this case, it becomes feasible to adequately reduce degradation of signal transmission performance due to the polarization mode dispersion on the occasion of carrying out high-bit-rate transmission.

In the optical fiber according to the first embodiment, a bending loss thereof in a bending diameter of 20 mm at the wavelength of 1550 nm is preferably 3 dB/m or less. In this case, it is feasible to reduce increase of loss due to microbend when the optical fiber is wound and housed in a coil form or when the optical fiber is laid.

In the optical fiber according to the first embodiment, a Petermann-I mode field diameter thereof at the wavelength of 1550 nm is preferably 10.0 μm or less. In this case, it is feasible to reduce increase of loss due to microbend in a cable form.

On the other hand, an optical fiber according to a second embodiment may have a cable cutoff wavelength of 1260 nm or less, a mode field diameter of 9 μm or less at the wavelength of 1310 nm, and a dispersion slope of 0.055 $ps/nm^2/km$ or less at the wavelength of 1550 nm. The optical fiber may further have a chromatic dispersion of 16 ps/nm/km or less, more preferably 15 ps/nm/km or less, at the wavelength of 1550 nm.

An optical fiber according to a third embodiment may have a mode field diameter of 9 μm or less at the wavelength of 1310 nm, and a dispersion slope of 0.082 $ps/nm^2/km$ or less at a zero dispersion wavelength. In the optical fiber herein, the dispersion slope at the zero dispersion wavelength is preferably 0.080 $ps/nm^2/km$ or less.

By adopting these optical fibers according to the second and third embodiments, it becomes feasible to achieve high-quality signal transmission even in cases where the multiplexed signal light of the 1.55 μm wavelength band is transmitted. In addition, these optical fibers of the second and third embodiments have excellent compatibility with the standard single-mode optical fiber defined by International Standard (ITU-T G.652). Namely, it becomes feasible to design and construct an optical communication system to which the optical fiber according to the present invention is applied, just as in the case of the optical communication systems to which the conventional single-mode optical fibers are applied. It also becomes feasible to construct an optical communication system in which the optical fiber according to the present invention is mixed with the conventional single-mode optical fibers.

In the optical fibers of the second and third embodiments, the transmission loss at the wavelength of 1550 nm is preferably 0.176 dB/km or less. In this case, it becomes feasible to construct an optical transmission path to transmit the signal light of the 1.55 μm wavelength band without a repeater over a long haul.

In the optical fibers of the second and third embodiments, preferably, the transmission loss at the wavelength of 1310 nm is 0.32 dB/km or less and the loss increase due to OH-radical at the wavelength of 1380 nm is 0.3 dB/km or less. In this case, it becomes feasible to construct an optical transmission path to transmit signal light of a wide band besides the 1.55 μm wavelength band without a repeater over a long haul.

The optical fibers of the second and third embodiments may be configured so that the zero dispersion wavelength is set to be 1300 nm or more but 1324 nm or less, whereby they can have further excellent compatibility with the standard single-mode optical fiber defined by International Standard (ITU-T G.652).

In the optical fibers of the first to third embodiments having the structure as described above, preferably, the cladding region is doped with fluorine, and the core region is not doped with $GeO_2$. In order to achieve the various optical characteristics as described above, these optical fibers of the first to third embodiments are so designed that an outer diameter of the core region is 7.5 μm or more but 8.6 μm or less and that a relative refractive index difference of the core region with respect to the cladding region is 0.36% or more but 0.42% or less.

Effect of the Invention

The present invention provides the optical fibers excellent in compatibility with the standard single-mode optical fiber defined by International Standard (ITU-T G.652) (capable of high-quality multiplexing transmission in the 1.3 μm wavelength band), capable of high-quality multiplexing transmission in the 1.55 μm wavelength band as well, and suitable for signal transmission in a wider band.

BRIEF DESCRIPTION OF THE DRAWINGS

FIG. 5 is a table showing a list of various characteristics of each of Sample A prepared as an optical fiber according to the present invention, and Comparative Example A.

FIG. 8 is a table showing a list of various characteristics of optical fibers according to respective Samples B-I and Comparative Example B.

DESCRIPTION OF REFERENCE SYMBOLS

10: optical fiber
11: core region
12: cladding region

BEST MODES FOR CARRYING OUT THE INVENTION

Each of embodiments of optical fibers according to the present invention will be described below in detail with reference to each of FIGS. 1 to 10. The same elements will be denoted by the same reference symbols throughout the description of the drawings, without redundant description.

Figure 1:
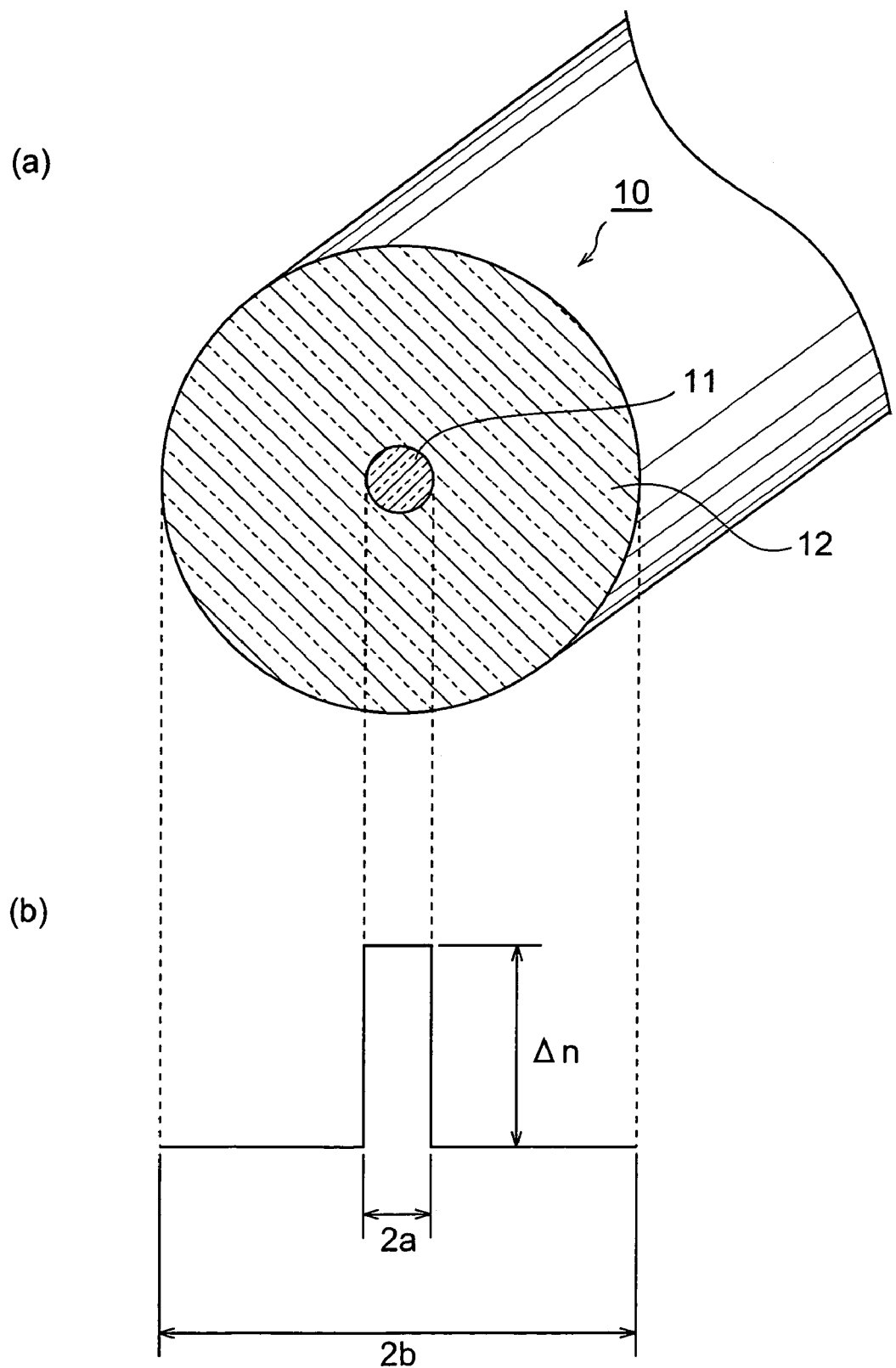
FIG. 1 is a sectional view and a refractive index profile for explaining a structure of an optical fiber according to the present invention.

FIG. 1 is an illustration for explaining a structure of an optical fiber according to the present invention. In FIG. 1, the area (a) is an illustration showing the cross-sectional structure perpendicular to the optical axis of optical fiber 10, and the area (b) is a refractive index profile of optical fiber 10. As shown in the area (a) of FIG. 1, the optical fiber 10 has a core region 11 with an outer diameter $2a$ having a circular cross section in the center, and a cladding region 12 surrounding the outer periphery of the core region 11. In the refractive index profile of optical fiber 10 shown in the area (b) of FIG. 1, the relative refractive index difference of the core region 11 to the cladding region 12 is $\Delta n$.

The optical fiber 10 is mainly comprised of silica glass and is preferably made so that the cladding region 12 is doped with fluorine and the core region 11 is pure silica glass without being doped with $GeO_2$. This is advantageous in reduction of transmission loss. The cable cutoff wavelength of optical fiber 10 is 1260 nm or less.

Figure 2:
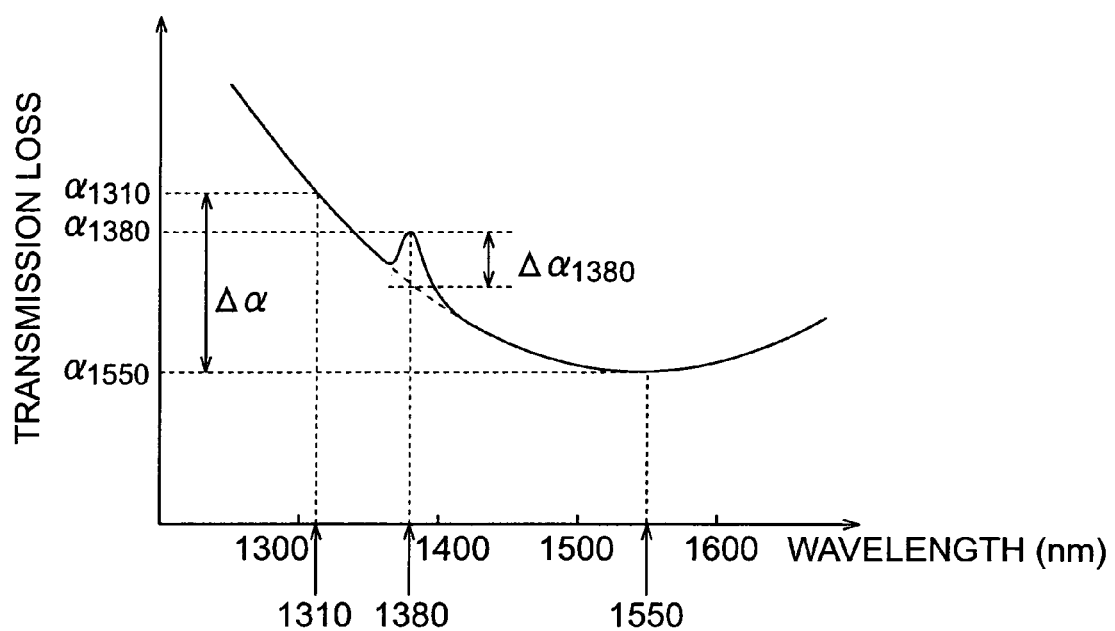
FIG. 2 is a graph showing wavelength dependence of transmission loss of an optical fiber according to the present invention.

FIG. 2 is a graph showing the wavelength dependence of transmission loss of an optical fiber according to the present invention. Since the optical fiber 10 is mainly comprised of silica glass, the transmission loss becomes minimum near the wavelength of 1550 nm, as shown in FIG. 2. The transmission loss at the wavelength of 1550 nm will be represented by $\alpha_{1550}$. In the optical fiber 10, the transmission loss $\alpha_{1310}$ at the wavelength of 1310 nm is 0.32 dB/km or less, and the OH-related loss increase $\Delta\alpha_{1380}$ at the wavelength of 1380 nm is 0.3 dB/km or less.

In this optical fiber 10, the transmission loss $a_{1310}$ at the wavelength of 1310 nm is small, and the loss increase $\Delta\alpha_{1380}$ due to OH-radical at the wavelength of 1380 nm is also small. Furthermore, since the cable cutoff wavelength is 1260 nm or less, this optical fiber 10 ensures transmission of signal light with low loss and in the single mode in a wide signal wavelength band ranging from the O-band to the L-band.

In the optical fiber 10, the transmission loss $\alpha_{1310}$ at the wavelength of 1310 nm is more preferably 0.30 dB/km or less and, in this case, the signal light near the wavelength of 1310 nm can be transmitted with lower loss and over a longer haul.

In the optical fiber 10, the transmission loss $\alpha_{1380}$ at the wavelength of 1380 nm is preferably smaller than the transmission loss $\alpha_{1310}$ at the wavelength of 1310 nm and this is advantageous in transmitting the signal light near the wavelength of 1380 nm with low loss and over a long haul.

In the optical fiber 10, a difference $\Delta\alpha(=\alpha_{1550}-\alpha_{1310})$ between the transmission loss $\alpha_{1550}$ at the wavelength of 1550 nm and the transmission loss $\alpha_{1310}$ at the wavelength of 1310 nm is preferably 0.13 dB/km or less. In this case, since the difference is small between the transmission losses at the two wavelengths, it becomes feasible to implement transmission of signal light with homogeneous performance in a wide signal wavelength band.

Figure 3:
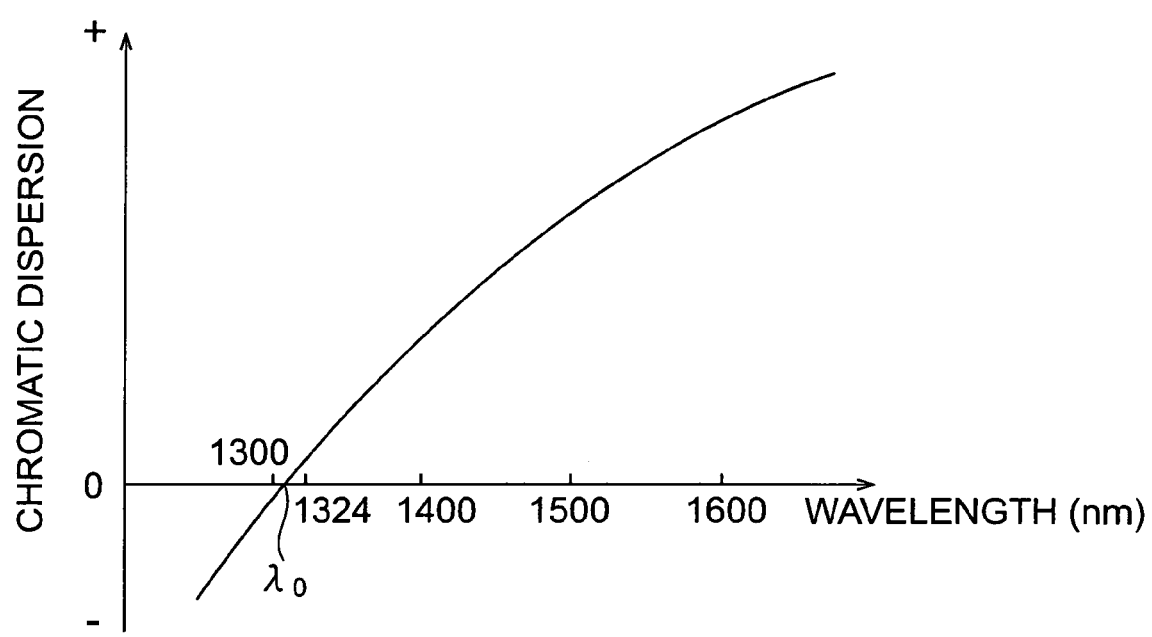
FIG. 3 is a graph showing wavelength dependence of chromatic dispersion of an optical fiber according to the present invention.

FIG. 3 is a graph showing the wavelength dependence of chromatic dispersion of an optical fiber according to the present invention. As shown in this FIG. 3, the longer the wavelength, the larger the chromatic dispersion of the optical fiber 10. The zero dispersion wavelength $\lambda_0$ of the optical fiber 10 is 1300 nm or more but 1324 nm or less. In this case, the zero dispersion wavelength of the optical fiber 10 is nearly equal to that of the standard single-mode optical fiber, and thus the optical fiber 10 is excellent in compatibility with the standard single-mode optical fiber and advantageous in view of dispersion compensation.

Furthermore, in the optical fiber 10 the polarization mode dispersion at the wavelength of 1550 nm is preferably 0.5 ps/km$^{1/2}$ or less. In this case, it is feasible to reduce degradation of transmission performance of signal light due to the polarization mode dispersion on the occasion of carrying out high-bit-rate transmission. In the optical fiber 10, the bending loss in the bending diameter of 20 mm at the wavelength of 1550 nm is preferably 3 dB/m or less. In this case, it becomes feasible to reduce increase of loss due to microbend when the optical fiber is wound and housed in a coil form or when it is laid. In the optical fiber 10, the Petermann-I mode field diameter at the wavelength of 1550 nm is preferably 10.0 µm or less. In this case, it is feasible to reduce increase of loss due to microbend in a cable form.

Next, a first sample (Sample A) prepared as an optical fiber according to the present invention will be described together with a first comparative example (Comparative Example A).

The optical fiber of Sample A has the sectional structure and refractive index profile shown in FIG. 1, the core region thereof is made of pure silica glass, and the cladding region is made of fluorine-doped silica glass. The outer diameter $2a$ of the core region is 7.9 µm and the outer diameter $2b$ of the cladding region 125 µm. The relative refractive index difference Δn of the core region with respect to the refractive index of the cladding region is 0.39%. In contrast to it, the optical fiber of Comparative Example A is the standard single-mode optical fiber, in which the core region thereof is made of $GeO_2$-doped silica glass and in which the cladding region is made of pure silica glass.

Figure 4:
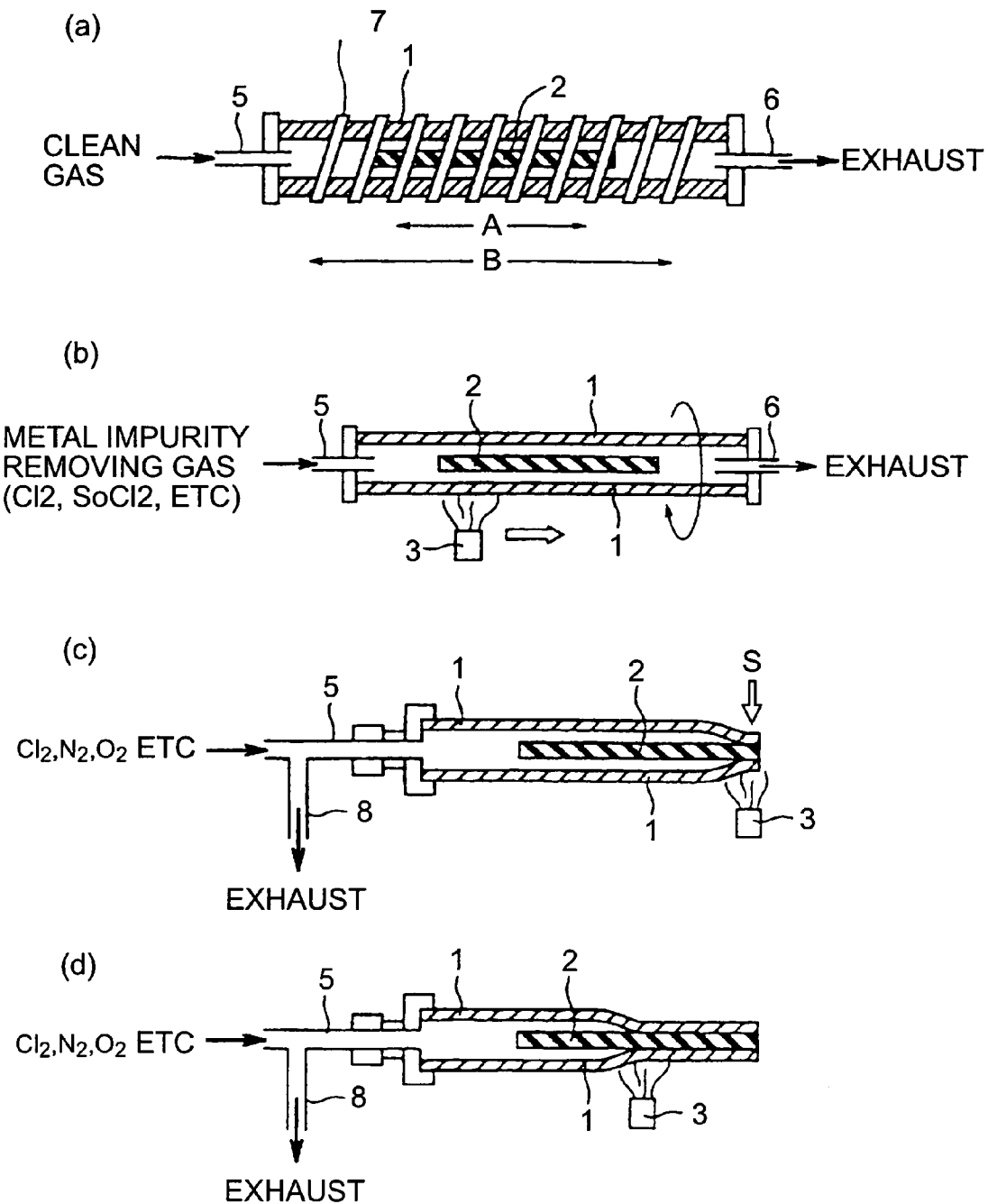
FIG. 4 is a step diagram for explaining a production method of a sample prepared as an optical fiber according to the present invention.

This optical fiber of Sample A is produced by a production method described below. Specifically, FIG. 4 is a step diagram for explaining a production method of each sample as an optical fiber according to the present invention. In the production process shown in FIG. 4, a high-purity silica glass rod is prepared by VAD, and this glass rod is drawn in a heating furnace at the temperature of about 2000° C. to create a glass rod 2 having the outer diameter of 3 mm and the length of 50 cm. In addition, a glass pipe 1 of fluorine-doped silica glass having the relative refractive index difference of –0.39% to pure silica glass is also prepared by VAD. This glass pipe 1 has the outer diameter of 20 mm and the inner diameter of 6 mm.

In a state in which the glass rod 2 is inserted in the glass pipe 1 with a tape heater 7 around, as shown in the area (a) of FIG. 4, clean $N_2$ gas (in which the $H_2O$ content is 0.5 ppm or less by volume and the content of the other H-containing gases is 0.1 ppm or less by volume) is allowed to flow at the flow rate of 2000 cc/min (hereinafter expressed as sccm) as a converted value in the standard temperature and pressure (the temperature of 0° C. and the pressure of 1 atm) through pipe 5 on the first end side of the glass pipe 1 into the glass pipe 1. On the other hand, the interior of the glass pipe 1 is evacuated through pipe 6 on the second end side of the glass pipe 1 up to the pressure of 2.5 kPa inside the glass pipe 1. At this time, not only region A to be heated at the temperature of 550° C. or more in each of the glass pipe 1 and glass rod 2 in each of subsequent steps of impurity removal, sealing, and unhollowing, but also region B including portions 200 mm long on both sides of region A are heated-at the temperature of 200° C. by the tape heater 7. The heated region B is set to include a range to be heated at the temperature of 550° C. or more in a subsequent unhollowing step. This state is maintained for four hours, while the aforementioned clean $N_2$ gas is allowed to flow and is discharged.

Subsequently, as shown in the area (b) of FIG. 4, a metal impurity removing gas (e.g., $Cl_2$ or $SOCl_2$) is introduced through the pipe 5 on the first end side of glass pipe 1 into the glass pipe 1, and the glass pipe 1 and glass rod 2 are heated at the temperature of 1150° C. by heat source 3. This results in removing metal impurities attached to each of the internal wall surface of the glass pipe 1 and the surface of the glass rod 2.

Thereafter, as shown in the area (c) of FIG. 4, the second end side of the glass pipe 1 is heated and melted by heat source 3, whereby the glass pipe 1 and the glass rod 2 are bonded so as to seal the region indicated by arrow S. The interior of the glass pipe 1 is depressurized into a vacuum state of pressure of 0.01 kPa or less through a gas line 8 as an exhaust pipe by a vacuum pump. Thereafter, clean $N_2$ gas (in which the $H_2O$ content is 0.5 ppm or less by volume and in which the content of the other H-containing gases is 0.1 ppm or less by volume) is introduced through the pipe 5 on the first end side of glass pipe 1 into the glass pipe 1. At this time, the vacuum pump is stopped to pressurize the interior of the glass pipe 1 to the pressure of 105 kPa. This depressurizing and pressurizing cycle is repeated three times to eliminate the gas (mainly $H_2O$) adsorbed on each of the inner wall surface of the glass pipe 1 and the surface of the glass rod 2.

Then the heat source 3 is sequentially moved from the second end side toward the first end side of the glass pipe 1, as shown in the area (d) of FIG. 4, to heat and melt the glass pipe 1 and the glass rod 2 to effect unhollowing (rod-in collapse method). At this time, $Cl_2$ gas of 500 sccm and $O_2$ gas of 500 sccm are introduced into the interior of the glass pipe 1. The pressure inside the glass pipe 1 is –1 kPa as a gage pressure, and the temperature of the outer surface of the glass pipe 1 during the unhollowing step is 1600° C. A first preform is obtained through the above steps.

This first preform has the outer diameter of 19 mm and the length of 400 mm, and a ratio of core diameter to cladding diameter is 6.6. Furthermore, this first preform is drawn to obtain a second preform having the outer diameter of 14 mm. Microparticles of $SiO_2$ obtained by introducing $SiCl_4$ into $H_2/O_2$ flame are deposited onto the outer periphery of the second preform with the outer diameter of 14 mm until the outer diameter becomes 120 mm. The deposit obtained in this manner is further heated to the temperature of 800° C. in a furnace. The furnace temperature is increased at a temperature rise rate of 33° C./min up to the temperature of 1500° C. During this period, He gas of 15000 sccm and $SF_6$ gas of 450 sccm are introduced into the furnace. A fiber preform is obtained as described above. Then this fiber preform is drawn into a fiber, thereby obtaining each sample of an optical fiber according to the present invention.

Figure 6:
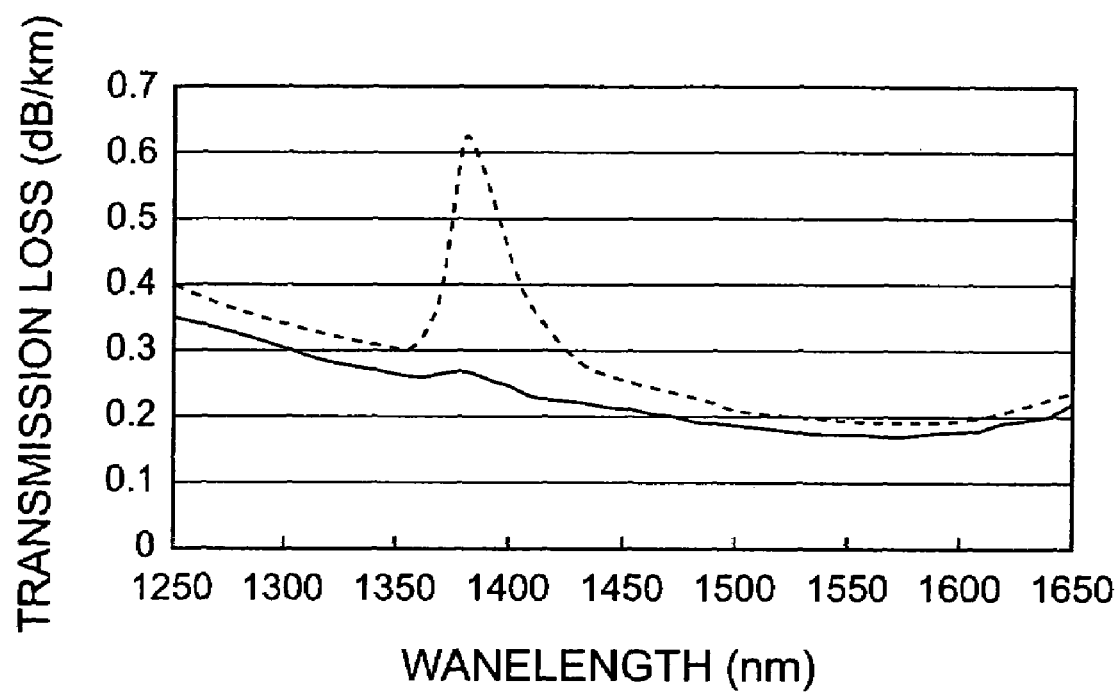
FIG. 6 is a graph showing wavelength dependence of transmission loss of each of Sample A prepared as an optical fiber according to the present invention, and Comparative Example A.

FIG. 5 is a table showing a list of various characteristics of the above-described optical fibers of Sample A and Comparative Example A. FIG. 6 is a graph showing the wavelength dependence of transmission loss of each of the optical fibers of Sample A and Comparative Example A. In FIG. 6, a solid line represents the transmission loss of the optical fiber of Sample A, and a dashed line the transmission loss of the optical fiber of Comparative Example A.

As can be seen from these FIGS. 5 and 6, the optical fiber of Comparative Example A has the transmission loss $\alpha_{1310}$ at the wavelength of 1310 nm of 0.33 dB/km, the transmission loss $\alpha_{1380}$ at the wavelength of 1380 nm of 0.62 dB/km; the transmission loss $\alpha_{1550}$ at the wavelength of 1550 nm of 0.19 dB/km, the loss difference $\Delta\alpha(=\alpha_{1550}-\alpha_{1310})$ of 0.14 dB/km; the loss increase $\Delta\alpha_{1380}$ due to OH-radical at the wavelength of 1380 nm of 0.31 dB/km.

On the other hand, the optical fiber of Sample A has the transmission loss $\alpha_{1310}$ at the wavelength of 1310 nm of 0.29 dB/km, the transmission loss $\alpha_{1380}$ at the wavelength of 1380 nm of 0.27 dB/km, the transmission loss $\alpha_{1550}$ at the wavelength of 1550 nm of 0.17 dB/km, the loss difference $\Delta\alpha$ of 0.12 dB/km, and the loss increase $\Delta\alpha_{1380}$ due to OH-radical at the wavelength of 1380 nm of 0.03 dB/km.

The optical fiber of Sample A also has the cable cutoff wavelength of 1220 nm, the zero dispersion wavelength of 1310 nm, the mode field diameter of 9.7 µm at the wavelength of 1550 nm, and the bending loss of 2 dB/m in the bending diameter of 20 mm at the wavelength of 1550 nm.

Furthermore, the optical fiber of Sample A is one in which noncircularity of each of the core region and the cladding region is well suppressed, and in which the polarization mode dispersion at the wavelength of 1550 nm is 0.1 ps/km$^{1/2}$ or less in a bobbin-wound state, and is 0.03 ps/km$^{1/2}$ or less in a bundle-coiled state in which external force is reduced.

Next, second to ninth samples (Samples B-I) prepared as optical fibers according to the present invention will be described in detail in comparison with a second comparative example (Comparative Example B).

Samples B-I prepared as optical fibers according to the present invention have the sectional structure and refractive index profile shown in FIG. 1. Namely, the optical fibers of respective Samples B-I have the core region with the outer diameter 2a, and the cladding region surrounding the outer periphery of the core region. The refractive index of the core region is higher than that of the cladding region, and the relative refractive index difference Δn of the core region with respect to the refractive index of the cladding region is positive.

Each of those optical fibers 1 of Samples B-I is also mainly comprised of silica glass, and both or one of the core region and the cladding region is doped with a dopant for adjustment of refractive index. The core region may be doped with $GeO_2$ and the cladding region may be made of pure silica glass; however, the core region is preferably made of pure silica glass without being doped with $GeO_2$ and the cladding region is preferably doped with fluorine. This composition can reduce the transmission loss of the resultant optical fiber.

Figure 7:
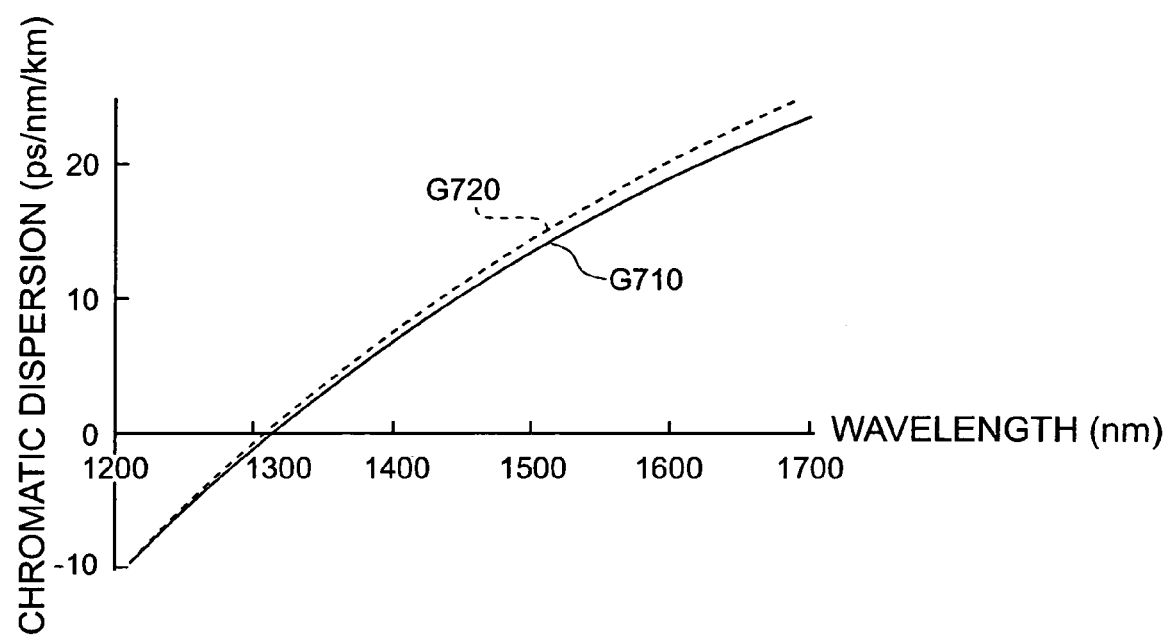
FIG. 7 is a graph showing a chromatic dispersion characteristic of an optical fiber according to the present invention, with respect to a chromatic dispersion characteristic of the standard single-mode optical fiber defined by International Standard (ITU-T G.652).

FIG. 7 is a graph showing the chromatic dispersion characteristic of an optical fiber according to the present invention, with respect to the chromatic dispersion characteristic of the standard single-mode optical fiber defined by International Standard (ITU-T G.652). In this FIG. 7, graph G710 indicates the chromatic dispersion characteristic of the optical fiber according to the present invention, and graph G720 the chromatic dispersion characteristic of the standard single-mode optical fiber defined by International Standard (ITU-T G.652). In this optical fiber, similar to the standard single-mode optical fiber, the zero dispersion wavelength is near the wavelength of 1300 nm, and the dispersion slope is positive in the range of wavelengths of 1200 nm to 1700 nm. However, the optical fiber has a smaller chromatic dispersion and a smaller dispersion slope at the wavelength of 1550 nm than the standard single-mode optical fiber.

Namely, in the optical fiber according to the present invention, the dispersion slope at the wavelength of 1550 nm is 0.055 ps/nm$^2$/km or less, and the chromatic dispersion at the wavelength of 1550 nm is 16 ps/nm/km or less and more preferably 15 ps/nm/km or less. In the optical fiber according to the present invention, the cable cutoff wavelength is 1260 nm or less and the mode field diameter at the wavelength of 1310 nm is 9 μm or less.

In another aspect, the optical fiber according to the present invention is characterized as follows: the mode field diameter at the wavelength of 1310 nm is 9 μm or less, and the dispersion slope at the zero dispersion wavelength is 0.082 ps/nm$^2$/km or less and more preferably 0.080 ps/nm$^2$/km or less.

By applying such an optical fiber as an optical transmission path, it becomes feasible to implement signal transmission with high quality in cases where the multiplexed signal light of the 1.55 μm wavelength band is transmitted. In addition, the optical fiber is excellent in compatibility with the standard single-mode optical fiber defined by International Standard (ITU-T G.652). Namely, as in the case of the optical communication systems in which the conventional single-mode optical fibers are applied to optical transmission paths, it becomes feasible to design and construct an optical communication system in which the optical fiber according to the present invention is applied to an optical transmission path. It also becomes feasible to construct an optical communication system in which the optical fiber according to the present invention is mixed with the conventional single-mode optical fibers.

In addition, in the optical fiber according to the present invention the transmission loss at the wavelength of 1550 nm is preferably 0.176 dB/km or less. The reason for it is that it becomes feasible to construct an optical transmission path to transmit signal light of the 1.55 μm wavelength band without a repeater over a long haul. Furthermore, preferably, the transmission loss at the wavelength of 1310 nm is 0.32 dB/km or less and the loss increase due to OH-radical at the wavelength of 1380 nm is 0.3 dB/km or less. In this case, it becomes feasible to construct an optical transmission path to transmit signal light of not only the 1.55 μm wavelength band but also a wide band including the 1.55 μm wavelength band, without a repeater over a long haul. Where the zero dispersion wavelength is 1300 nm or more but 1324 nm or less, excellent compatibility is obtained with the standard single-mode optical fiber defined by International Standard (ITU-T G.652).

Next, the second to ninth samples (Samples B-I) of optical fibers according to the present invention will be described with reference to FIGS. 8 to 10. FIG. 8 is a table showing a list of various characteristics of the optical fibers of respective Samples B-I and Comparative Example B. The optical fibers of respective Samples B-I have the sectional structure and refractive index profile shown in FIG. 1. Namely, the core region is made of pure silica glass and the cladding region of fluorine-doped silica glass. On the other hand, the optical fiber of Comparative Example B is a single-mode optical fiber compliant with International Standard (ITU-T G.652), in which the core region is made of $GeO_2$-doped silica glass and in which the cladding region is made of pure silica glass.

This FIG. 8 presents the characteristics of each optical fiber of Samples B-I and Comparative Example B: the relative refractive index difference Δn (%), the core diameter 2a (μm), the cable cutoff wavelength (nm), the mode field diameter (μm) at the wavelength of 1310 nm, the zero dispersion wavelength (nm), the chromatic dispersion (ps/nm/km) at the wavelength of 1550 nm, the dispersion slope (ps/nm$^2$/km) at the wavelength of 1550 nm, the zero dispersion slope (ps/nm$^2$/km), the transmission loss (dB/km) at the wavelength of 1310 nm, the transmission loss (dB/km) at the wavelength of 1380 nm, the loss increase (dB/km) due to OH-radical at the wavelength of 1380 nm, the transmission loss (dB/km) at the wavelength of 1550 nm; and the fiber structure.

Specifically, in the optical fiber of Sample B, the relative refractive index difference Δn is 0.38%, the core diameter 2a is 7.80 μm, the cable cutoff wavelength is 1166 nm, the mode field diameter at the wavelength of 1310 nm is 8.53 μm, the zero dispersion wavelength is 1318 nm, the chromatic dispersion at the wavelength of 1550 nm is 14.97 ps/nm/km, the dispersion slope at the wavelength of 1550 nm is 0.0540 ps/nm$^2$/km, and the zero dispersion slope is 0.0793 ps/nm$^2$/km.

In the optical fiber of Sample C, the relative refractive index difference Δn is 0.395%, the core diameter 2a is 8.16 μm, the cable cutoff wavelength is 1230 nm, the mode field diameter at the wavelength of 1310 nm is 8.60 μm, the zero dispersion wavelength is 1313 nm, the chromatic dispersion at the wavelength of 1550 nm is 15.46 ps/nm/km, the dispersion slope at the wavelength of 1550 nm is 0.0544 ps/nm²/km, and the zero dispersion slope is 0.0806 ps/nm²/km.

In the optical fiber of Sample D, the relative refractive index difference Δn is 0.39%, the core diameter 2a is 8.02 μm, the cable cutoff wavelength is 1200 nm, the mode field diameter at the wavelength of 1310 nm is 8.57 μm, the zero dispersion wavelength is 1313 nm, the chromatic dispersion at the wavelength of 1550 nm is 15.39 ps/nm/km, the dispersion slope at the wavelength of 1550 nm is 0.0537 ps/nm²/km, and the zero dispersion slope is 0.0801 ps/nm²/km.

In the optical fiber of Sample E, the relative refractive index difference Δn is 0.395%, the core diameter 2a is 7.56 μm, the cable cutoff wavelength is 1135 nm, the mode field diameter at the wavelength of 1310 nm is 8.37 μm, the zero dispersion wavelength is 1318 nm, the chromatic dispersion at the wavelength of 1550 nm is 14.86 ps/nm/km, the dispersion slope at the wavelength of 1550 nm is 0.0531 ps/nm²/km, and the zero dispersion slope is 0.0789 ps/nm²/km.

In the optical fiber of Sample F, the relative refractive index difference Δn is 0.42%, the core diameter 2a is 7.60 μm, the cable cutoff wavelength is 1260 nm, the mode field diameter at the wavelength of 1310 nm is 8.33 μm, the zero dispersion wavelength is 1307 nm, the chromatic dispersion at the wavelength of 1550 nm is 15.75 ps/nm/km, the dispersion slope at the wavelength of 1550 nm is 0.0536 ps/nm²/km, and the zero dispersion slope is 0.0816 ps/nm²/km.

In the optical fiber of Sample G, the relative refractive index difference Δn is 0.385%, the core diameter 2a is 8.14 μm, the cable cutoff wavelength is 1184 nm, the mode field diameter at the wavelength of 1310 nm is 8.72 μm, the zero dispersion wavelength is 1312 nm, the chromatic dispersion at the wavelength of 1550 nm is 15.90 ps/nm/km, the dispersion slope at the wavelength of 1550 nm is 0.0547 ps/nm²/km, and the zero dispersion slope is 0.0800 ps/nm²/km.

In the optical fiber of Sample H, the relative refractive index difference Δn is 0.38%, the core diameter 2a is 8.52 μm, the cable cutoff wavelength is 1226 nm, the mode field diameter at the wavelength of 1310 nm is 8.92 μm, the zero dispersion wavelength is 1304 nm, the chromatic dispersion at the wavelength of 1550 nm is 16.66 ps/nm/km, the dispersion slope at the wavelength of 1550 nm is 0.0548 ps/nm²/km, and the zero dispersion slope is 0.0819 ps/nm²/km.

In the optical fiber of Sample I, the relative refractive index difference Δn is 0.36%, the core diameter 2a is 8.10 μm, the cable cutoff wavelength is 1133 nm, the mode field diameter at the wavelength of 1310 nm is 8.92 μm, the zero dispersion wavelength is 1317 nm, the chromatic dispersion at the wavelength of 1550 nm is 15.39 ps/nm/km, the dispersion slope at the wavelength of 1550 nm is 0.0544 ps/nm²/km, and the zero dispersion slope is 0.0790 ps/nm²/km.

Regarding all the optical fibers of Samples B-I, the transmission loss at the wavelength of 1310 nm is 0.32 dB/km or less; the transmission loss at the wavelength of 1380 nm is 0.31 dB/km or less, the loss increase due to OH-radical at the wavelength of 1380 nm is 0.10 dB/km or less, and the transmission loss at the wavelength of 1550 nm is 0.176 dB/km or less. Each of the optical fibers has the pure silica core and the F-doped cladding.

On the other hand, the optical fiber of Comparative Example B has the cable cutoff wavelength of 1158 nm, the mode field diameter of 9.13 μm at the wavelength of 1310 nm, the zero dispersion wavelength of 1316 nm, the chromatic dispersion of 16.50 ps/nm/km at the wavelength of 1550 nm, the dispersion slope of 0.0584 ps/nm²/km at the wavelength of 1550 nm, and the zero dispersion slope of 0.0850 ps/nm²/km. In addition, the transmission loss at the wavelength of 1310 nm is 0.33 dB/km, the transmission loss at the wavelength of 1380 nm is 0.62 dB/km, the loss increase due to OH-radical at the wavelength of 1380 nm is 0.31 dB/km, and the transmission loss at the wavelength of 1550 nm is 0.19 dB/km. This optical fiber of Comparative Example B has the Ge-doped core and the pure silica cladding.

Figure 9:
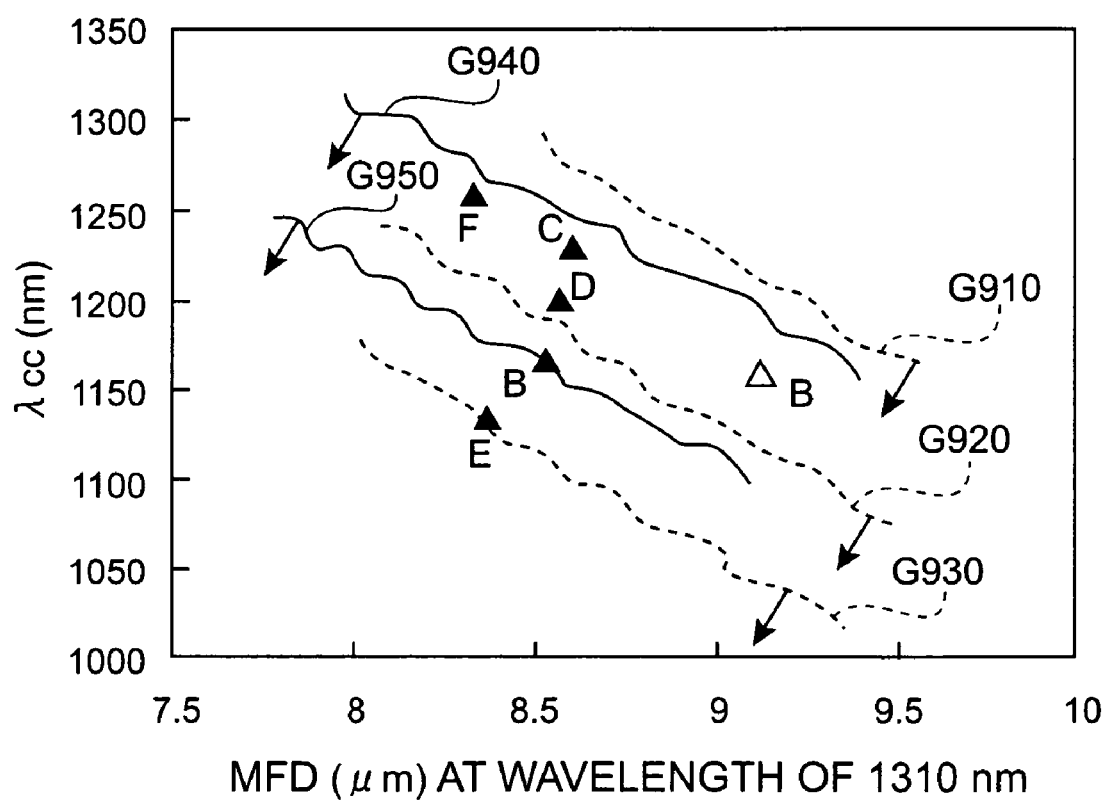
FIG. 9 is a graph showing locations of (MFD, $\lambda_{cc}$) of the optical fibers of respective Samples B-F and Comparative Example B on a two-dimensional space defined by the horizontal axis of the mode field diameter MFD at the wavelength of 1310 nm and the vertical axis of the cable cutoff wavelength $\lambda_{cc}$, and also showing equal chromatic dispersion curves.

FIG. 9 is a graph showing locations of (MFD, $\lambda_{cc}$) of the optical fibers of respective Samples B-F and Comparative Example B, on a two-dimensional space in which the horizontal axis represents the mode field diameter MFD at the wavelength of 1310 nm and the vertical axis the cable cutoff wavelength $\lambda_{cc}$, and also showing equal chromatic dispersion curves at the wavelength of 1550 nm. In this FIG. 9, marks ▲B-▲F indicate (MFD, $\lambda_{cc}$) of the optical fibers of Samples B-F, and mark ΔB (MFD, $\lambda_{cc}$) of the optical fiber of Comparative Example B. Graph G910 indicates an equal chromatic dispersion curve of a standard single-mode optical fiber with the chromatic dispersion of 17 ps/nm/km or less, graph G920 an equal chromatic dispersion curve of a standard single-mode optical fiber with the chromatic dispersion of 16 ps/nm/km or less, and graph G930 an equal chromatic dispersion curve of a standard single-mode optical fiber with the chromatic dispersion of 15 ps/nm/km or less. On the other hand, graph G940 indicates an equal chromatic dispersion curve of a fiber having the pure silica core with the chromatic dispersion of 16 ps/nm/km or less, and graph G950 an equal chromatic dispersion curve of an optical fiber having the pure silica core with the chromatic dispersion of 15 ps/nm/km or less.

As can be seen from FIG. 9, the optical fiber of each sample has the small chromatic dispersion even with the same MFD and $\lambda_{cc}$, in comparison with the optical fiber of Comparative Example B.

Figure 10:
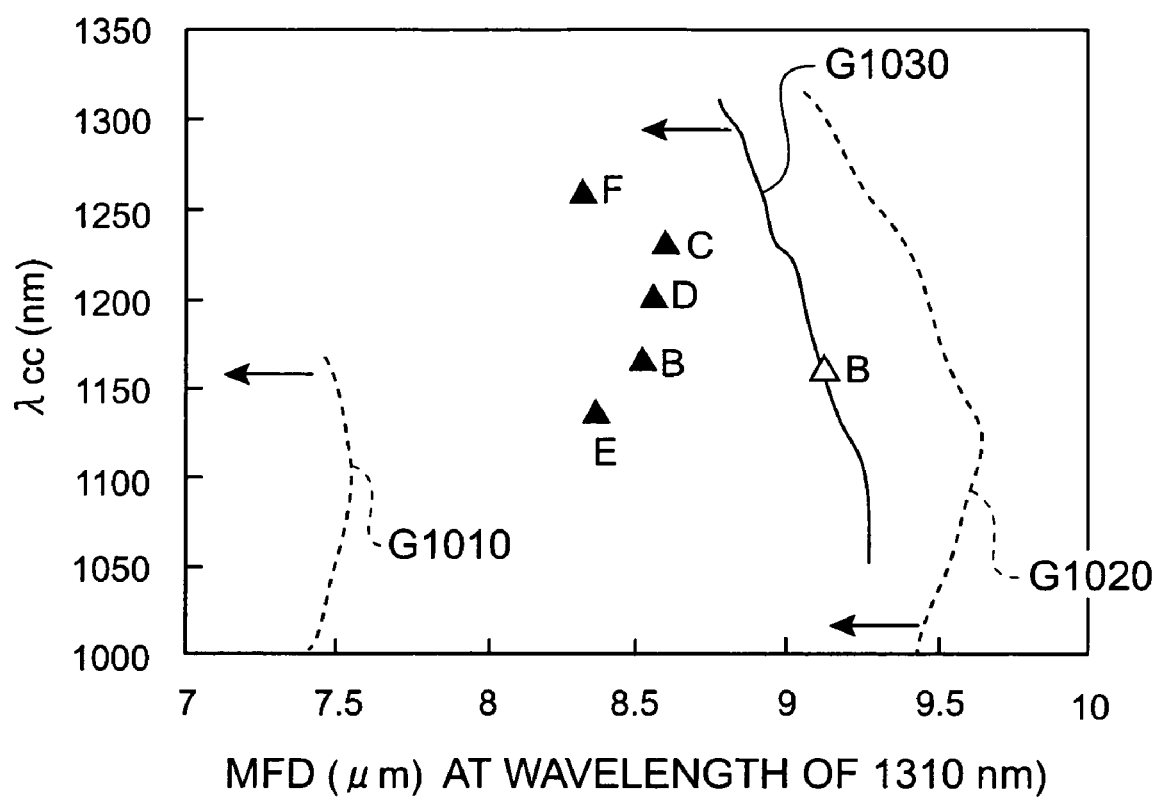
FIG. 10 is a graph showing locations of (MFD, $\lambda_{cc}$) of the optical fibers of respective Samples B-F and Comparative Example B on a two-dimensional space defined by the horizontal axis of the mode field diameter MFD at the wavelength of 1310 nm and the vertical axis of the cable cutoff wavelength $\lambda_{cc}$, and also showing equal dispersion slope curves.

FIG. 10 is a graph showing locations of (MFD, $\lambda_{cc}$) of the optical fibers of respective Samples B-F and Comparative Example B, on the two-dimensional space in which the horizontal axis represents the mode field diameter MFD at the wavelength of 1310 nm and the vertical axis the cable cutoff wavelength $\lambda_{cc}$, and also showing equal dispersion slope curves at the wavelength of 1550 nm. In this FIG. 10, marks ▲B-▲F indicate (MFD, $\lambda_{cc}$) of the optical fibers of Samples B-F, and mark ΔB (MFD, $\lambda_{cc}$) of the optical fiber of Comparative Example B. Graph G1010 indicates an equal dispersion slope curve of a standard single-mode optical fiber with the dispersion slope of 0.055 ps/nm²/km or less, and graph G1020 an equal dispersion slope curve of a standard single-mode optical fiber with the dispersion slope of 0.059 ps/nm²/km or less. On the other hand, graph G1030 indicates an equal dispersion slope curve of an optical fiber having the pure silica core with the dispersion slope of 0.055 ps/nm²/km or less. As can be seen from FIG. 10, the optical fiber of each sample has the small dispersion slope even with the same MFD and $\lambda_{cc}$, in comparison with the optical fiber of Comparative Example B.

As described above, the optical fibers according to the present invention as described above, in which the mode field diameter MFD at the wavelength of 1310 nm is 9 μm or less, have the small chromatic dispersion at the wavelength of 1550 nm and the small dispersion slope at the wavelength of 1550 nm even with the same cable cutoff wavelength $\lambda_{cc}$ and the same mode field diameter MFD at the wavelength of 1310 nm, in comparison with the $GeO_2$-doped silica-based optical fiber compliant with International Standard (ITU-T G.652).

INDUSTRIAL APPLICABILITY

The optical fibers according to the present invention are applicable to the optical communication not only in the 1.31 µm wavelength band but also in the 1.55 wavelength band, as transmission media of WDM optical communication systems capable of transmitting signal light of multiple channels.

The invention claimed is:

1. An optical fiber complying with the International Standard of ITU-T G.652 and comprising a core region extending along a predetermined axis, and a cladding region provided on an outer periphery of said core region and mainly comprised of silica glass, said optical fiber having:
 a cable cutoff wavelength of 1260 nm or less;
 a transmission loss of 0.32 dB/km or less at a wavelength of 1310 nm; and
 a OH-related loss increase of 0.3 dB/km or less at a wavelength of 1380 nm,
 wherein said cladding region is doped with fluorine.

2. An optical fiber according to claim 1, wherein the transmission loss at the wavelength of 1310 nm is 0.30 dB/km or less.

3. An optical fiber according to claim 1, wherein a transmission loss at the wavelength of 1380 nm is lower than a transmission loss at the wavelength of 1310 nm.

4. An optical fiber according to claim 1, wherein a difference between a transmission loss at a wavelength of 1550 nm and a transmission loss at the wavelength of 1310nm is 0.13 dB/km or less.

5. An optical fiber according to claim 1, further having a zero dispersion wavelength in the range of 1300 nm to 1324 nm.

6. An optical fiber according to claim 1, further having a polarization mode dispersion of 0.5 $ps/km^{1/2}$ or less at a wavelength of 1550 nm.

7. An optical fiber according to claim 1, further having a bending loss of 3dB/m or less in a bending diameter of 20 mm at a wavelength of 1550 nm.

8. An optical fiber according to claim 1, further having a Petermann-I mode field diameter of 10.0 µm or less at a wavelength of 1550 nm.

9. An optical fiber according to claim 1, wherein said core region contains no $GeO_2$.

10. An optical fiber according to claim 1, wherein said core region has an outer diameter in the range of 7.5 µm to 8.6 µm, and
 wherein a relative refractive index difference of said core region with respect to said cladding region falls within the range of 0.36% to 0.42%.

* * * * *